(12) United States Patent
Jiang et al.

(10) Patent No.: US 11,868,838 B2
(45) Date of Patent: Jan. 9, 2024

(54) DEVICE SUPPORTING CARD-SWIPING

(71) Applicant: Hangzhou Hikvision Digital Technology Co., Ltd., Hangzhou (CN)

(72) Inventors: Nan Jiang, Hangzhou (CN); Shujun Zhang, Hangzhou (CN); Shisen Qian, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 52 days.

(21) Appl. No.: 17/611,633

(22) PCT Filed: Apr. 13, 2020

(86) PCT No.: PCT/CN2020/084485
§ 371 (c)(1),
(2) Date: Nov. 16, 2021

(87) PCT Pub. No.: WO2020/233281
PCT Pub. Date: Nov. 26, 2020

(65) Prior Publication Data
US 2022/0253616 A1    Aug. 11, 2022

(30) Foreign Application Priority Data

May 17, 2019   (CN) .......................... 201910413055.8
May 17, 2019   (CN) .......................... 201920710405.2

(51) Int. Cl.
*G06K 7/10*    (2006.01)
*G06K 7/08*    (2006.01)

(52) U.S. Cl.
CPC ......... *G06K 7/10366* (2013.01); *G06K 7/082* (2013.01); *G06K 7/10316* (2013.01)

(58) Field of Classification Search
CPC . G06K 7/10366; G06K 7/082; G06K 7/10316
(Continued)

(56) References Cited

U.S. PATENT DOCUMENTS

| 10,809,564 | B1 | 10/2020 | Bidari |
| 2010/0116883 | A1* | 5/2010 | Cost ..................... G06K 7/0004 362/558 |

(Continued)

FOREIGN PATENT DOCUMENTS

| CN | 203027314 | 6/2013 |
| CN | 203057230 | 7/2013 |

(Continued)

OTHER PUBLICATIONS

Extended European Search Report issued in Corresponding European Application No. 20810771.4, dated May 20, 2022.
(Continued)

*Primary Examiner* — Jamara A Franklin
(74) *Attorney, Agent, or Firm* — NORTON ROSE FULBRIGHT US LLP

(57) ABSTRACT

The present application provides a device supporting card-swiping, which relates to the technical field of communications. The device supporting card-swiping comprises a display screen (1), a protective back plate (2) and a contactless card reader (3). Wherein the antenna (310) of the contactless card reader (3) is arranged between the display screen (1) and the protective back plate (2) for sensing a user's card swiping signal. The device supporting card-swiping can increase the effective card swiping distance and improve user experience.

11 Claims, 2 Drawing Sheets

(58) Field of Classification Search
USPC .................................................. 235/435, 451
See application file for complete search history.

(56) References Cited

U.S. PATENT DOCUMENTS

| 2011/0263292 | A1* | 10/2011 | Phillips | H04M 17/00 |
|---|---|---|---|---|
| | | | | 235/492 |
| 2012/0055992 | A1 | 3/2012 | Hsieh et al. | |
| 2012/0322374 | A1 | 12/2012 | Yamaoka et al. | |
| 2013/0162594 | A1 | 6/2013 | Paulsen et al. | |
| 2014/0080411 | A1 | 3/2014 | Konanur et al. | |
| 2014/0291404 | A1 | 10/2014 | Matsuoka et al. | |
| 2015/0207205 | A1 | 7/2015 | Kato et al. | |
| 2016/0142866 | A1 | 5/2016 | Jang et al. | |
| 2017/0237170 | A1 | 8/2017 | Manzi | |
| 2019/0006756 | A1 | 1/2019 | Lee et al. | |

FOREIGN PATENT DOCUMENTS

| CN | 203813016 | 9/2014 |
|---|---|---|
| CN | 204464443 | 7/2015 |
| CN | 204925550 | 12/2015 |
| CN | 205911423 | 1/2017 |
| CN | 206574841 | 10/2017 |
| CN | 207069050 | 3/2018 |
| CN | 209962253 | 1/2020 |
| JP | 2007257483 | 10/2007 |
| JP | 2009205336 | 9/2009 |
| JP | 2010283333 | 12/2010 |
| JP | 2014057243 | 3/2014 |
| JP | WO2014083990 | 1/2017 |
| JP | 6197951 | 9/2017 |
| WO | WO 2014/083990 | 6/2014 |
| WO | WO 2015/163295 | 10/2015 |
| WO | WO 2018/061282 | 4/2018 |
| WO | WO 2018/225702 | 12/2018 |

OTHER PUBLICATIONS

Office Action issued in corresponding Japanese Patent Application No. 2021-568834, dated Dec. 6, 2022 (English Machine Translation Provided).

International Search Report and Written Opinion issued in Corresponding PCT Application No. PCT/CN2020/084485, dated Jul. 9, 2020 (English Translation provided).

Yu et al., "21.4: Smart Display and Antenna Integrated System" International Conference on Display Technology 2020, Feb. 24, 2021, 52(S1), 140-142.

Office Action issued in corresponding Korean Application No. 1020217041472 dated Oct. 13, 2023.

* cited by examiner

DEVICE SUPPORTING CARD-SWIPING

CROSS REFERENCE TO RELATED APPLICATIONS

The present application is a national phase application under 35 U.S.C. § 371 of International Application No. PCT/CN2020/084485, filed Apr. 13, 2020, which claims the benefit of priority to Chinese patent application No. 201920710405.2, filed with China National Intellectual Property Administration on May 17, 2019 and entitled "Device supporting card-swiping", and Chinese patent application No. 201910413055.8, filed with China National Intellectual Property Administration on May 17, 2019 and entitled "Device supporting card-swiping", each of which are incorporated herein by reference in their entireties.

TECHNICAL FIELD

The application relates to the technical field of communications, in particular to a device supporting card-swiping.

BACKGROUND

Devices that support card-swiping, such as self-service terminal devices in banking halls, can improve the speed of business processing for users, and can be widely used in banking, communications, transportation and other industries.

In the related art, a device supporting card-swiping includes a liquid crystal display, the protective back plate of the liquid crystal display, a contactless card reader and the housing of the device, wherein the contactless card reader is arranged on the rear side of the protective back plate and is used for sensing and processing a card swiping signal generated by a card swiping operation from a user on the liquid crystal display. The contactless card reader includes an antenna, a processor, an RF module, a connection circuit and other components, which are all integrated on a main board except the antenna. Since the material of the protective back plate is metal, in order to facilitate the propagation of RF signals emitted by the antenna, an opening is provided at the position of the protective back plate opposite to the antenna, through which the RF signals emitted by the antenna can reach the smart card of the user, so as to read and write the information contained in the smart card. Wherein, the smart card is for example an IC card (Integrated Circuit Card), an ID card (Identification Card).

SUMMARY

The purpose of embodiments of the present application is to provide a device supporting card-swiping, which can increase the effective card swiping distance and improve user experience. The specific technical solutions are as follows.

An embodiment of the present application provides a device supporting card-swiping, which includes a display screen 1, a protective back plate 2 and a contactless card reader 3, wherein the antenna 310 of the contactless card reader 3 is arranged between the display screen 1 and the protective back plate 2 for sensing a user's card swiping signal.

In a possible implementation, the device further includes a first magnetic component 4 on which the antenna 310 is fixed, and the first magnetic component 4 is configured to shield the antenna 310 from the magnetic field interference of the surrounding environment.

In a possible implementation, the size of the first magnetic component 4 is greater than or equal to the size of the antenna 310.

In a possible implementation, the material of the first magnetic component 4 includes ferrite.

In a possible implementation, when the material of the first magnetic component 4 is ferrite, the thickness of the first magnetic component 4 is 0.1 mm to 0.3 mm.

In a possible implementation, an opening 210 is provided at a position corresponding to the antenna 310 in the protective back plate 2.

In a possible implementation, the size of the opening 210 is greater than or equal to the size of the antenna 310.

In a possible implementation, the opening 210 is covered with a second magnetic component 5, whose size is greater than or equal to the size of the opening 210.

In a possible implementation, the material of the second magnetic component 5 includes ferrite.

In a possible implementation, when the material of the second magnetic component 5 is ferrite, the thickness of the second magnetic component 5 is 0.1 mm to 0.3 mm.

In a possible implementation, the contactless card reader 3 further includes a main board 320 arranged on the rear side of the protective back plate 2 and connected to the antenna 310.

In a possible implementation, the antenna 310 is attached onto the display screen 1.

In a possible implementation, the material of the protective back plate 2 is a non-metal material, and the antenna 310 is arranged on the rear side of the protective back plate 2.

The device supporting card-swiping according to the embodiment of the present application includes a display screen 1, a protective back plate 2 and a contactless card reader 3, wherein the antenna 310 of the contactless card reader 3 is used for sensing a card swiping operation from a user. Since the antenna 310 is arranged between the display screen 1 and the protective back plate 2, the distance between the antenna 310 and the smart card of the user can be reduced, thereby increasing the effective card swiping distance and improving user experience. Of course, any product or method implementing the present application does not need to achieve all the advantages mentioned above at the same time.

BRIEF DESCRIPTION OF THE DRAWINGS

In order to explain the technical solutions of the embodiments of the present application and the prior art more clearly, the drawings needed to be used in the embodiments and the prior art are introduced briefly below. Obviously, the drawings described below are only some embodiments of the present application, and other drawings can be obtained by those skilled in the art based on these drawings without any creative effort.

DESCRIPTION OF REFERENCE SIGNS

1—display screen, 2—protective back plate, 3—contactless card reader, 4—first magnetic component, 5—second magnetic component, 210—opening, 310—antenna, 320—main board, 311—card reader antenna terminal, 321—card reader antenna port and 322—card reader chip.

DETAILED DESCRIPTION

In order to make the purpose, technical solution and advantages of the present application more apparent, the present application will be further described in detail with reference to the drawings and embodiments. Obviously, the described embodiments are only a part, instead of all, of the embodiments of the present application. Based on the embodiments in the present application, all other embodiments obtained by those with ordinary skills in the art without creative efforts fall into the protection scope of the present application.

The embodiment of the present application provides a device supporting card-swiping, which can be a device including a liquid crystal display screen and a contactless card reader, for example, a mobile phone, a card swiping device for access control, a card swiping device for public transportation, and a card swiping device for assisting users to process business in business halls. The device can read from and write into the smart card of a user, which may be an IC card or an ID card, etc. The device can also read from and write into other devices that support the reading and writing of a reader, such as an NFC (Near Field Communication) mobile phone. The device supporting card-swiping according to the embodiment of the present application not only can provide a function of card swiping at the display screen, but also has a larger effective card swiping distance, so that the user can swipe a card within the effective card swiping distance of the liquid crystal display screen and improve the user experience.

Figure 1:
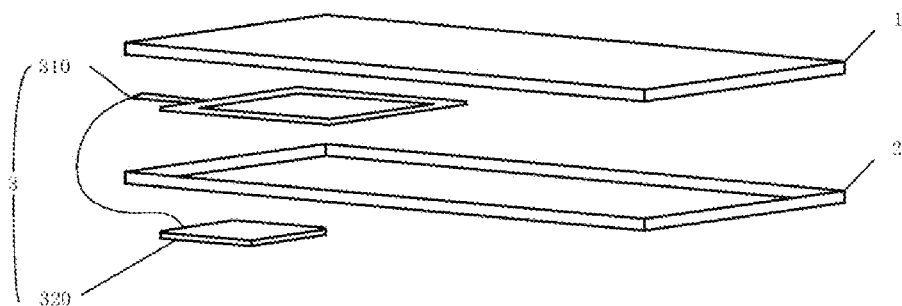
FIG. 1 is a first schematic structural diagram of a device supporting card-swiping according to an embodiment of the present application.

As shown in FIG. 1, the device according to an embodiment of the present application includes a display screen 1, a protective back plate 2 and a contactless card reader 3. The antenna 310 of the contactless card reader 3 is arranged between the display screen 1 and the protective back plate 2 for sensing a user's card swiping signal.

Wherein, the material of the protective back plate 2 may be a metal or non-metal material, which is not specifically limited in the embodiment of the present application.

In an embodiment, the antenna 310 may be arranged at any position between the display screen 1 and the protective back plate 2, and the installation position of the antenna 310 can be determined according to actual design requirements by a device designer. The fixing manner of the antenna 310 includes adhesive fixation, for example, the antenna 310 is fixed on the back adhesive coated on the display screen 1. The area corresponding to the antenna 310 in the display screen 1 can be used as a card swiping area for a user to swipe a card, which thus can provide the user with the function of swiping the card at the display screen.

In the related art, when card swiping is needed, a card swiping area will be prompted on the display screen, and the user will swipe a card or another device that supports the reading and writing of a card reader closely to the card swiping area. Since the effective card swiping distance of the device supporting card-swiping is related to the position of the antenna, the closer the antenna is set to the plane of the card swiping area of the display screen, the larger the effective card swiping distance of the device is. In the related art, the contactless card reader is arranged on a side of the protective back plate away from the display screen, that is, on the rear side of the protective back plate. On the contrary, the antenna 310 is arranged between the display screen 1 and the protective back plate 2 in the embodiment of the present application, which can reduce the distance between the antenna 310 and the display screen 1 and make the antenna 310 closer to the display screen 1, so that the effective card swiping distance of the device supporting card-swiping can be increased.

Optionally, the contactless card reader 3 further includes a main board 320 arranged on the rear side of the protective back plate 2 and connected to the antenna 310.

In addition to the antenna 310, the contactless card reader 3 can also include a main board 320, which is arranged on the rear side of the protective back plate 2, that is, a side of the protective back plate 2 away from the display screen. The main board 320 can include a processor, an RF module, a connection circuit and other components, which are used to provide software and hardware support for card reading.

Figure 2:
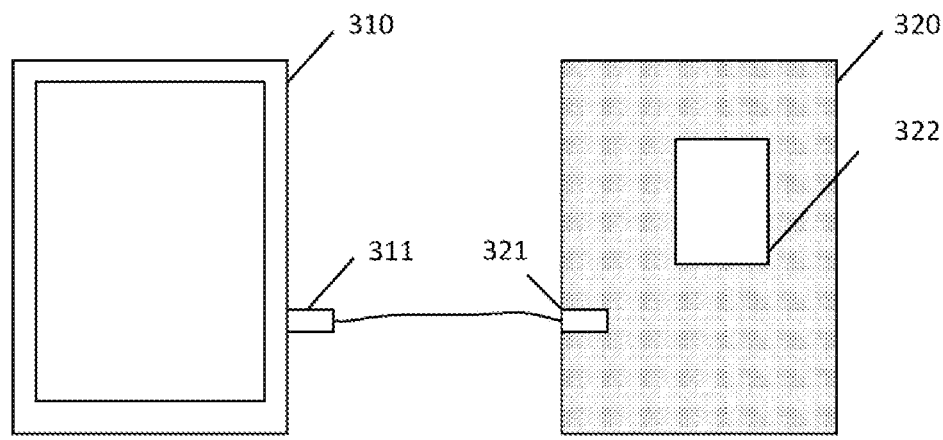
FIG. 2 is a schematic structural diagram of a contactless card reader according to an embodiment of the present application.

In a possible implementation, the structure of the contactless card reader 3 according to an embodiment of the present application can be shown in FIG. 2, wherein the main board 320 includes a card reader antenna port 321 and a card reader chip 322.

The card reader antenna port 321 in the main board 320 is connected to the card reader antenna terminal 311 in the antenna 310 through a preset connection component, which may include one of a connecting wire, a connector, a spring piece and a pogo pin (pogo pin connector). The port type of the card reader antenna port 321 can be selected according to actual requirements, for example, a FPC (Flexible Printed Circuit) base, a solder hole, a spring piece, etc., but the terminal type of the card reader antenna terminal 311 should match the port type of the card reader antenna port 321.

In this embodiment of the present application, since the main board 320 can be connected to the antenna 310 through a connecting wire, the length of the connecting wire should be adapted to the installation position of the main board 320 in the device. The fixing manner of the main board 320 may be adhesive fixation or mechanical fixation, etc., for example, the main board 320 is fixed inside the housing of the device by locking snap-fit or screwed fixation. Since the main board 320 is arranged on the rear side of the protective back plate 2, the main board 320 can be provided away from the antenna 310, so that the assembly positions of the main board 320, the antenna 310 and other components of the device can be flexibly arranged during the product layout, and further the magnetic field interference generated by the electronic components in the main board 320 on the antenna 310 can be reduced.

Figure 3:
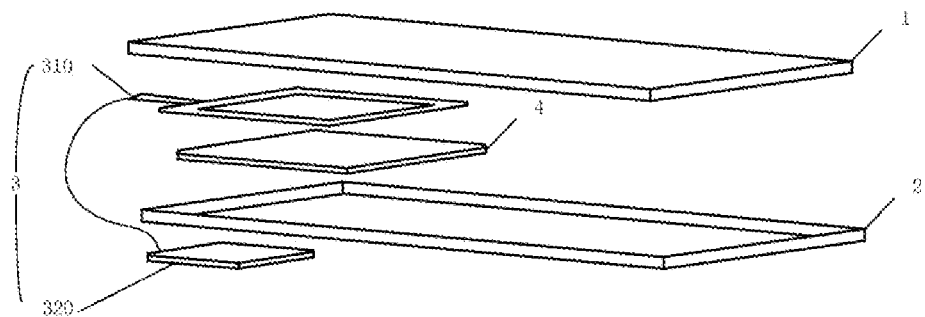
FIG. 3 is a second schematic structural diagram of a device supporting card-swiping according to an embodiment of the present application.

Optionally, in order to avoid the magnetic field interference to the antenna 310 generated by the metal protective back plate 2 and electronic components in the circuit board that may be arranged near the antenna 310, as shown in FIG. 3, a device supporting card-swiping in an embodiment of the present application may further include a first magnetic component 4, on which the antenna 310 is fixed. The first magnetic component 4 is configured to shield the antenna 310 from the magnetic field interference of the surrounding environment.

In an embodiment of the present application, there are various fixed positions of the antenna 310 and the first magnetic component 4, which can be customized according to the actual situation. In an embodiment, the antenna 310 can be fixed on the first magnetic component 4 by adhesive fixation. In a possible implementation, the antenna 310 can be fixed on the back adhesive coated on the display screen 1, and the first magnetic component 4 can be fixed on the back adhesive coated on the antenna 310. In another possible implementation, the first magnetic component 4 can be fixed on the back adhesive coated on the protective back plate 2, and the antenna 310 can be fixed on the back adhesive coated on the first magnetic component 4.

In this embodiment of the present application, the device supporting card-swiping includes the first magnetic component 4, on which the antenna 310 is fixed. Therefore, the first magnetic component 4 can prevent the magnetic field generated by the antenna 310 from forming eddy current, which generates a reverse magnetic field, on the nearby metal protective back plate 2, and can reduce the attenuation of the magnetic field intensity in the direction of card swiping by a user due to the reverse magnetic field, thus increasing the effective card swiping distance and improving the user experience.

Figure 4A:
FIG. 4a is a first schematic diagram of a first magnetic component according to an embodiment of the present application.
Figure 4B:
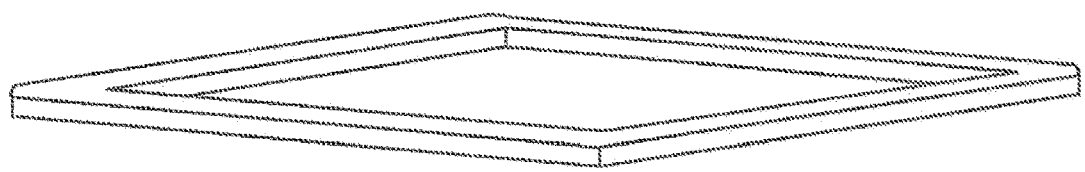
FIG. 4b is a second schematic diagram of a first magnetic component according to an embodiment of the present application.

Optionally, the size of the first magnetic component 4 is greater than or equal to the size of the antenna 310. The first magnetic component 4 may be plate-shaped as shown in FIG. 4a, or frame-shaped as shown in FIG. 4b.

In this embodiment of the present application, the size of the first magnetic component 4 is greater than or equal to the size of the antenna 310, which can improve the shielding effect of the first magnetic component 4 on the magnetic field interference of the surrounding environment to the antenna 310.

Figure 5:
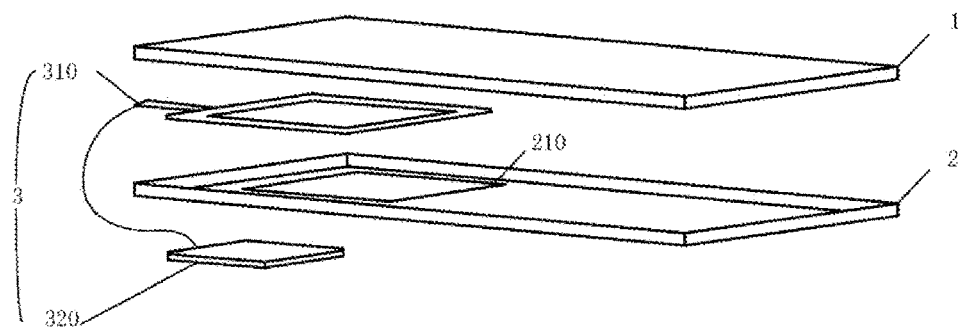
FIG. 5 is a third schematic structural diagram of a device supporting card-swiping according to an embodiment of the present application.

Optionally, in order to avoid the magnetic field interference to the antenna 310 caused by the metal protective back plate 2 and electronic components in the circuit board that may be arranged near the antenna 310, an embodiment of the present application further provides a device supporting card-swiping, as shown in FIG. 5, wherein an opening 210 is arranged at the position corresponding to the antenna 310 in the protective back plate 2.

In an embodiment of the present application, an opening is arranged at the position corresponding to the antenna 310 in the protective back plate 2 of the device supporting card-swiping, which can prevent the magnetic field generated by the antenna 310 from forming eddy current, which generates a reverse magnetic field, at the opening position, and can reduce the attenuation of the magnetic field intensity in the direction of card swiping by a user due to the reverse magnetic field, thus increasing the effective card swiping distance and improving the user experience.

Optionally, when there is no opening in the protective back plate 2, by means of the included first magnetic component 4, the device supporting card-swiping can prevent the magnetic field generated by the antenna 310 from forming eddy current, which generates a reverse magnetic field, on the nearby metal protective back plate 2, and can reduce the attenuation of the magnetic field intensity in the direction of card swiping by a user due to the reverse magnetic field, thus increasing the effective card swiping distance and improving the user experience.

Optionally, the size of the opening 210 is greater than or equal to the size of the antenna 310.

In this embodiment of the present application, the size of the opening 210 is greater than or equal to the size of the antenna 310, which can improve the shielding effect of magnetic field interference of the surrounding environment to the antenna 310.

Figure 6:
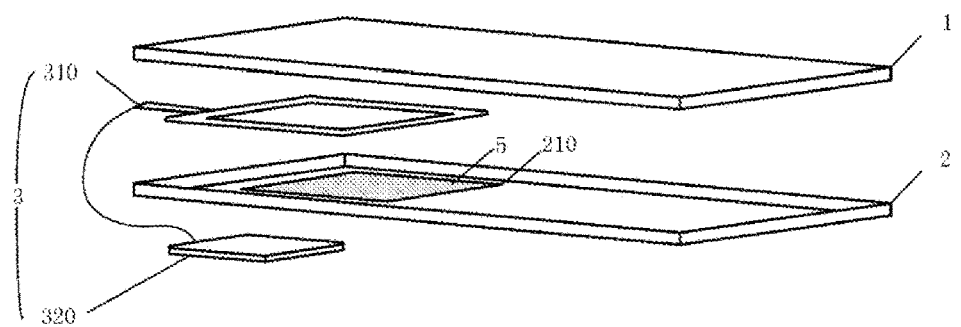
FIG. 6 is a fourth schematic structural diagram of a device supporting card-swiping according to an embodiment of the present application.

Optionally, in order to further reduce the magnetic field interference of the surrounding environment of the antenna 310, a device supporting card-swiping according to an embodiment of the present application can also be as shown in FIG. 6, wherein the opening 210 is covered with the second magnetic component 5, and the size of the second magnetic component 5 is greater than or equal to the size of the opening 210. The antenna 310 can be fixed on the second magnetic component 5, and also can be fixed on the display screen 1.

In an embodiment of the present application, an opening is arranged at the position corresponding to the antenna 310 in the protective back plate 2 of the device supporting card-swiping, and is covered with the second magnetic component 5, which can further prevent the magnetic field generated by the antenna 310 from forming eddy current, which generates a reverse magnetic field, at the opening position, and can reduce the attenuation of the magnetic field intensity in the direction of card swiping by a user due to the reverse magnetic field, thus increasing the effective card swiping distance and improving the user experience.

In a possible implementation, the material of the first magnetic component 4 includes ferrite. In a possible implementation, the material of the second magnetic component 5 includes ferrite.

Optionally, the material of the first magnetic component 4 or the second magnetic component 5 includes ferrite. In this embodiment of the present application, the material of the first magnetic component 4 or the second magnetic component 5 can be any magnetic material, such as ferrite, neodymium magnet and boron plastic magnet. The first magnetic component 4 or the second magnetic component 5 may be plate-shaped ferrite.

Since ferrite has the characteristics of high absorption of electromagnetic waves, using ferrite as the material of the first magnetic component 4 or the second magnetic component 5 can improve the shielding effect of the first magnetic component 4 or the second magnetic component 5 on the magnetic field interference of the surrounding environment to the antenna 310. The thickness of the first magnetic component 4 and/or the second magnetic component 5 may be customized according to the actual situation.

In a possible implementation, when the material of the second magnetic component 5 is ferrite, the thickness of the second magnetic component 5 is 0.1 mm to 0.3 mm. In a possible implementation, when the material of the first magnetic component 4 is ferrite, the thickness of the first magnetic component 4 is 0.1 mm to 0.3 mm.

Optionally, when the material of the first magnetic component 4 or the second magnetic component 5 is ferrite, the thickness of the first magnetic component 4 or the second magnetic component 5 ranges 0.1 mm to 0.3 mm. A device designer can choose a certain value from 0.1 mm to 0.3 mm, or choose another value as the thickness of the first magnetic component 4 or the second magnetic component 5 according to actual design requirements.

Optionally, in the device supporting card-swiping according to an embodiment of the present application, regarding the installation position of the antenna 310, the antenna 310 can be attached onto the display screen 1. Therefore, the antenna 310 can be attached onto the display screen 1 as close as possible, which increases the effective card swiping distance.

Optionally, the material of the protective back plate 2 is a non-metal material, and the antenna 310 is arranged on the rear side of the protective back plate 2. Wherein, the material of the protective back plate 2 may be a non-metallic material such as plastics or special ceramics.

In an embodiment of the present application, when the material of the protective back plate 2 is a non-metal material, the protective back plate 2 will not generate magnetic field interference to the antenna 310, so the protective back plate 2 will not attenuate the magnetic field intensity in the direction of card swiping by a user, which can increase the effective card swiping distance and improve the user experience. At the same time, the antenna 310 is arranged on the rear side of the protective back plate 2, so that the assembly positions of the main board 320, the antenna 310 and other components of the device can be flexibly arranged during product layout, and the processing difficulty of the product can be reduced.

An embodiment of the present application further provides a card swiping method, which is applied to the above-mentioned device supporting card-swiping. In the display screen 1 of the device supporting card-swiping, the area corresponding to the antenna 310 is a card swiping area where a card swiping operation is performed, and the user can swipe the card at the display screen. The specific process of swiping the card includes the followings. The antenna 310 can radiate electromagnetic waves, and when a user puts a smart card close to the card swiping area, the antenna 310 can generate current signals according to the changing magnetic field. Then, the antenna 310 can send the generated current signals to the main board 320, and the main board 320 can determine the card information in the smart card according to the received current signals, in order to perform subsequent card swiping processing. For example, the card swiping processing here can be deducting fees from the corresponding account of the user.

The above description is only the preferred embodiment of the present application, and is not intended to limit the present application. Any modification, equivalent replacement, improvement, etc. made within the spirit and principle of the present application should be included in the scope of protection of the present application.

What is claimed is:

1. A device supporting card-swiping, comprising a display screen (1), a protective back plate (2) and a contactless card reader (3), wherein an antenna (310) of the contactless card reader (3) is arranged between the display screen (1) and the protective back plate (2) for sensing a user's card swiping signal;
    wherein an opening (210) is arranged at a position corresponding to the antenna (310) in the protective back plate (2);
    wherein the opening (210) is covered with a magnetic component (5), whose size is greater than or equal to a size of the opening (210).

2. The device according to claim 1, further comprising a first magnetic component (4) on which the antenna (310) is fixed, wherein the first magnetic component (4) is configured to shield the antenna (310) from magnetic field interference of a surrounding environment.

3. The device according to claim 2, wherein a size of the first magnetic component (4) is greater than or equal to a size of the antenna (310).

4. The device according to claim 2, wherein a material of the first magnetic component (4) comprises ferrite.

5. The device according to claim 4, wherein when the material of the first magnetic component (4) is ferrite, a thickness of the first magnetic component (4) ranges from 0.1 mm to 0.3 mm.

6. The device according to claim 1, wherein a size of the opening (210) is greater than or equal to a size of the antenna (310).

7. The device according to claim 1, wherein a material of the magnetic component (5) comprises ferrite.

8. The device according to claim 7, wherein when the material of the magnetic component (5) is ferrite, a thickness of the magnetic component (5) ranges from 0.1 mm to 0.3 mm.

9. The device according to claim 1, wherein the contactless card reader (3) further comprises a main board (320) arranged on a rear side of the protective back plate (2) and connected to the antenna (310).

10. The device according to claim 1, wherein the antenna (310) is attached onto the display screen (1).

11. The device according to claim 1, wherein a material of the protective back plate (2) is a non-metal material, and the antenna (310) is arranged on a rear side of the protective back plate (2).

* * * * *